United States Patent [19]

Bernard

[11] 4,437,946
[45] Mar. 20, 1984

[54] STABILIZATION OF ALUMINUM ELECTROLYTIC CAPACITOR FOIL

[75] Inventor: Walter J. Bernard, Williamstown, Mass.

[73] Assignee: Sprague Electric Company, North Adams, Mass.

[21] Appl. No.: 528,183

[22] Filed: Aug. 31, 1983

[51] Int. Cl.$^3$ .................. C25C 11/08; C25C 11/12; C25C 11/18
[52] U.S. Cl. .................. 204/35 N; 204/38 A; 204/42; 204/58
[58] Field of Search ............... 204/42, 58, 35 N, 38 A

[56] References Cited

U.S. PATENT DOCUMENTS

| 1,012,889 | 12/1911 | Mershon | 204/58 |
| 1,068,410 | 7/1913 | Chubb | 204/58 |
| 1,658,976 | 2/1928 | Edelman | 204/58 |
| 2,076,904 | 4/1937 | Lilienfeld | 204/58 |
| 2,116,449 | 5/1938 | Robinson | 204/58 |
| 4,252,575 | 2/1981 | Bernard | 204/38 A |

FOREIGN PATENT DOCUMENTS 50-46468  10/1975  Japan .................. 204/42

Primary Examiner—R. L. Andrews

[57] ABSTRACT

Aluminum electrolytic capacitor foil is stabilized by passing the foil from an anodization step through a bath containing an aqueous borate solution at a temperature of at least 80° C. and a pH of 8.5 to 9.5. After stabilization, the foil is reanodized.

4 Claims, No Drawings

STABILIZATION OF ALUMINUM ELECTROLYTIC CAPACITOR FOIL

BACKGROUND OF THE INVENTION

This invention relates to the stabilization of aluminum capacitor foil after anodization by passing the foil through a bath containing an aqueous borate solution at a temperature of at least 80° C. and a pH of 8.5 to 9.5. After stabilization, the foil is reanodized.

It has been well-documented that aluminum capacitor foil after apparently complete formation of a high voltage dielectric oxide film evidences instability as shown by a sudden loss of field strength. This behavior is most markedly observed when the foil also bears a hydrous oxide layer formed prior to anodization. There is general agreement in the electrolytic capacitor industry that this dielectric instability is caused by the creation of voids within the formed dielectric oxide layer. It has been further postulated that oxygen gas is trapped within these voids and is liberated during the treatment ("depolarization") that brings about a relaxation in the strength of the dielectric.

Whatever the actual physical mechanism which may be involved, it is known to remedy the situation by various so-called depolarizing techniques—heating, immersion in hot water with and without various additives, mechanical flexing, pulsed currents, current reversal, or a combination of these—in short, methods which tend to relax or crack the dielectric barrier layer oxide so that these voids may be filled with additional dielectric oxide and thereby impart permanent stability to the oxide film.

When the anodization electrolyte is of the boric acid or boric acid/borate type, the resulting oxide film is attacked by water to form a non-insulating hydrous oxide. When the anodization electrolyte is of the hydration-inhibiting type, e.g., citrate or phosphate, the film is not so readily attacked. This degradation can occur by water in rinse baths, by the working electrolyte in the final capacitor, and even by exposure to air, particularly with borate dielectric films, not just by immersion in hot water.

Thus, one of the stabilization techniques, immersion in hot water, acts to open up the barrier layer dielectric oxide and expose or heal the voids and also forms hydrous oxide and/or attacks the dielectric film. It is desirable to direct the process so that it will relax or open the dielectric oxide film to permit stabilization without seriously damaging the dielectric film.

Various additives have been used in the hot water immersion stage in the past to inhibit formation of hydrous oxide while permitting stabilization or to strip excess hydrous oxide from the foil. These additives have proved beneficial, but more improvement is needed.

SUMMARY OF THE INVENTION

Aluminum electrolytic capacitor foil is stabilized after anodization by passage through a bath containing an aqueous borate solution at a temperature of at least 80° C. and a pH of 8.5 to 9.5 and then reanodized. Preferably, the bath contains 0.001–0.05 moles/liter of borax, the temperature is 90°–100° C., and at least two stabilization cycles are used with three being preferable.

Borax or boric acid at acidic pH controls the hydration of aluminum foil in aqueous solutions. At pH 8.5–9.5, the borax is more effective than the reaction with water in opening up the dielectric film. The solution may form hydrous oxide in the voids which is converted to barrier layer oxide in a subsequent reanodization step. At this pH, the borax may attack the excess hydrous oxide present with minimum damage to the barrier layer dielectric oxide, presumably because of the mildly alkaline conditions. Whatever happens, a stable dielectric oxide is formed after reanodization, i.e., the foil displays lower leakage currents and little change in capacitance. This stability is tested by immersion in boiling water and measuring electrical properties in comparison to foil which has not been so stabilized.

DESCRIPTION OF THE PREFERRED EMBODIMENTS

Anodized foil, preferably intermediate to high voltage foil (200–750 V) is stabilized by passing foil into a bath containing 0.001–0.05 moles/liter of borax at a pH of 8.5 to 9.5 and a temperature of 90°–100° C. The temperature is chosen to give adequate reaction time without being unduly long. The residence time in the borax bath should not be less than two minutes or there is incomplete reaction. More than eight minutes is unnecessary as there is no further benefit in longer times. The actual time is within this range and depends upon the speed at which foil transport has been set. The temperature should be at least 80° C. as below that temperature the reaction is too slow to be useful. The pH is critical as at this pH stabilization occurs without excessive damage to barrier layer oxide. At least two stabilization-reanodization cycles are used, with three preferred for best results.

Depolarization of high voltage foil is more effectively carried out when the medium employed is a hot, slightly alkaline aqueous solution. However, the pH cannot be permitted to exceed 9.5 because of the rapid and uncontrollable dissolution of the aluminum oxide film that may occur under such conditions. For that reason, it is not feasible to use solutions of sodium hydroxide, potassium hydroxide or the strong bases. Ammonium hydroxide, a common and inexpensive base, is also not suitable because of its great volatility and the attendant difficulty in maintaining a solution of well-controlled composition.

There are a large number of materials, namely buffered solutions of weak acids, that will perform adequately and whose pH can be easily controlled. Care must be taken, however, to employ only those which will not be injurious to the electrolytic capacitor constructed from the foil. It is likely that even after extensive and careful washing of the foil after complete processing trace amounts of the compounds from the bath will persist in the minute pores and recesses of the etched foil, and it is naturally desirable that the presence of these residues be innocuous in regard to capacitor properties and reliability.

Among the possible acceptable substances that lend themselves to this application are buffered solutions of boric acid, phenol, phthalic acid, acetic acid, citric acid, tartaric acid, and carbonic acid (mixtures of sodium bicarbonate and sodium carbonate). However, borax is preferred as it is easy to control the composition and pH of borax solutions, and it is non-injurious to aluminum foil. Its anion, borate ion, also is commonly present in anodizing electrolytes and capacitor fill or working electrolytes. Therefore, the use of borax reduces the possibility of anion interference or competing reactions.

EXAMPLE 1

In the following chart, seven oxide quality determinations were made on high voltage (about 350 V) foil with "1" being the highest rating. Knee volts and end volts refer to the voltage from the aging curve where there is an inflection following a rapid voltage change (knee point) and final (end) voltage where the curve plateaus out. Measurements were made both before and after boiling for five minutes in deionized water. A "boil-build" test was also performed in which the foil is immersed in boiling water, re-anodized, and checked for instability, e.g., increase in capacitance and loss in dielectric strength. Except for the "boil-build" test, the tests were run using a glycol-borate electrolyte. Sample A was anodized in a phosphate electrolyte, received no borax treatment, but was boiled and reanodized. Sample BBB was similarly anodized and was treated and reanodized three times using a 0.02–0.03 M borax treating solution at about 92° C.

TABLE 1

| Sample | A | BBB |
| --- | --- | --- |
| End volts | 5.5 | 2 |
| Knee volts | 5.5 | 2.5 |
| Time to knee | 4 | 4 |
| End volts (boiled) | 7 | 2 |
| Knee volts (boiled) | 6 | 2 |
| Time to knee (boiled) | 5 | 1 |
| Boil-build | 3 | 1 |
| Total | 36 | 14.5 |

Thus, it can be seen that the borax treatment increases foil stability dramatically.

EXAMPLE 2

It has also been shown that dielectric oxide films prepared in boric acid electrolytes may be similarly stabilized. In the table below laboratory results are shown for 1, 2, and 3 treatments. The foil is initially boiled to form the hydrous oxide layer and anodized to 400 V, treated in the borax solution and reanodized, and treated and reanodized twice more. Sample 1 was treated with boiling water for 3 minutes while sample 2 was treated with a 0.1 M borax solution for 30 seconds after gas evolution ("depolarization") occurs. There was an induction period with the borax solution and this was an easy way to measure reaction time. Capacitance is in microfarads, dissipation factor as a percent, and reform time in seconds, and capacitance and % DF were measured after each reformation.

TABLE 2

| | Cap | % DF | Reform Time | Cap | % DF |
| --- | --- | --- | --- | --- | --- |
| Sample 1 | | | | | |
| initial | 4.127 | 6.6 | — | — | — |
| 1st treat | 21.6 | 46.4 | 228 | 3.755 | 8.1 |
| 2nd treat | 13.2 | 36.0 | 60 | 3.795 | 8.6 |
| 3rd treat | 6.250 | 15.2 | 15 | 4.134 | 8.2 |
| Sample 2 | | | | | |
| initial | 4.128 | 6.6 | — | — | — |
| 1st treat | 10.5 | 17.8 | 74 | 4.208 | 6.5 |
| 2nd treat | 9.7 | 18.2 | 29 | 4.217 | 6.2 |
| 3rd treat | 6.885 | 13.3 | 23 | 4.227 | 6.0 |

Capacitance increase is a measure of the instability of the dielectric oxide. It can be readily seen that even after one borax treatment, the film is more stable than with boiling water alone. More than three treatment steps can be used, but any additional improvement is slight so as to make additional stages unjustiifable.

The process will work with less than 0.001 M borax solution but below this the concentration is difficult to control, and in very dilute solutions (pH of about 8 or less) the solution begins to act as a hydration inhibitor rather than showing the desired stabilization action. More than 0.05 moles/liter of borax (2% solution) is not needed, and there are indications that more concentrated solutions attack the dielectric oxide.

The specified pH range corresponds to the desirable borax concentrations and is a convenient process control. The temperature is maintained at 90° C. at least to provide a desirable reaction rate. Preferably, it is kept below 100° C. to keep the solution from boiling over and to reduce violent bubbling as the foil enters the solution.

What is claimed is:

1. A process for stabilizing anodized capacitor foil comprising passing said foil from an anodization step through a stabilizing bath containing a borate solution at a temperature of at least 80° C. and at a pH of 8.5 to 9.5 for from 2 to 8 minutes, and reanodizing, the cycle of said stabilizing and reanodizing being performed at least twice.

2. A process according to claim 1 wherein there are three of said cycles.

3. A process according to claim 1 wherein said temperature is 90° to 100° C. in said bath.

4. A process according to claim 1 wherein said solution is a 0.001 to 0.05 M borax solution.

* * * * *